(12) United States Patent
Altshuler et al.

(10) Patent No.: US 11,265,225 B2
(45) Date of Patent: Mar. 1, 2022

(54) SYSTEMS AND METHODS FOR PREDICTION OF ANOMALIES

(71) Applicant: Netz Forecasts Ltd., Tel-Aviv (IL)

(72) Inventors: Yaniv Altshuler, Ramat Yishay (IL); Goren Gordon, Rishon LeZion (IL)

(73) Assignee: Netz Forecasts Ltd., Tel-Aviv (IL)

( * ) Notice: Subject to any disclaimer, the term of this patent is extended or adjusted under 35 U.S.C. 154(b) by 0 days.

(21) Appl. No.: 17/289,251

(22) PCT Filed: Oct. 28, 2019

(86) PCT No.: PCT/IL2019/051158
§ 371 (c)(1),
(2) Date: Apr. 28, 2021

(87) PCT Pub. No.: WO2020/089887
PCT Pub. Date: May 7, 2020

(65) Prior Publication Data
US 2021/0314234 A1 Oct. 7, 2021

Related U.S. Application Data

(63) Continuation of application No. 16/172,808, filed on Oct. 28, 2018, now abandoned.

(51) Int. Cl.
*G06F 15/16* (2006.01)
*H04L 41/147* (2022.01)
(Continued)

(52) U.S. Cl.
CPC .......... *H04L 41/147* (2013.01); *G06F 16/288* (2019.01); *G06Q 30/0251* (2013.01);
(Continued)

(58) Field of Classification Search
CPC . H04L 41/147; H04L 41/145; H04L 41/0816; H04L 41/12; H04L 41/142; H04L 67/10
See application file for complete search history.

(56) References Cited

U.S. PATENT DOCUMENTS

2003/0220984 A1 11/2003 Jones
2012/0137367 A1* 5/2012 Dupont .................. G06F 21/00
726/25
(Continued)

FOREIGN PATENT DOCUMENTS

WO WO 2020/089887 5/2020

OTHER PUBLICATIONS

International Preliminary Report on Patentability dated May 6, 2021 From the International Bureau of WIPO Re. Application No. PCT/IL2019/051158. (7 Pages).
(Continued)

*Primary Examiner* — Padma Mundur

(57) ABSTRACT

There is provided a method for adapting components of a network, comprising: providing graphs each indicative of a respective sequential snapshot of a dynamic graph obtained over a historical time interval, wherein nodes of the graphs denote entities, and edges of the graphs denote interactions between the entities over a network, computing community graphs according to the graphs, computing meta-community graphs according to the community graphs, analyzing dynamics of the community graphs to detect changes between two temporally adjacent community graphs, analyzing dynamics of the meta-community graphs to detect changes between two temporally adjacent meta-community graphs, identifying at least one entity corresponding to node(s) of the dynamic graph according to a predicted likelihood of performing an anomalous action during a future time interval, and generating instructions for adapting component(s) of the network for ensuring availability of network resources for interactions between entities during the future time interval.

30 Claims, 8 Drawing Sheets

(51) Int. Cl.
    *H04L 41/14*         (2022.01)
    *H04L 41/142*       (2022.01)
    *H04L 41/12*         (2022.01)
    *G06Q 30/02*        (2012.01)
    *H04L 41/0816*      (2022.01)
    *G06F 16/28*        (2019.01)
    *H04L 67/10*        (2022.01)

(52) U.S. Cl.
    CPC .......... *H04L 41/0816* (2013.01); *H04L 41/12* (2013.01); *H04L 41/142* (2013.01); *H04L 41/145* (2013.01); *H04L 67/10* (2013.01)

(56) References Cited

U.S. PATENT DOCUMENTS

| | | | |
|---|---|---|---|
| 2016/0092774 A1* | 3/2016 | Wang | G06F 16/285 |
| | | | 706/12 |
| 2016/0219066 A1 | 7/2016 | Vasseur et al. | |
| 2018/0146000 A1 | 5/2018 | Muddu et al. | |
| 2020/0136923 A1 | 4/2020 | Altshuler et al. | |

OTHER PUBLICATIONS

International Search Report and the Written Opinion dated Feb. 25, 2020 From the International Searching Authority Re. Application No. PCT/IL2019/051158. (16 Pages).
Official Action dated Jul. 30, 2020 from the US Patent and Trademark Office Re. U.S. Appl. No. 16/172,808. (26 pages).

* cited by examiner

SYSTEMS AND METHODS FOR PREDICTION OF ANOMALIES

RELATED APPLICATIONS

This application is a National Phase of PCT Patent Application No. PCT/IL2019/051158 having International filing date of Oct. 28, 2019, which is a Continuation of priority of U.S. patent application Ser. No. 16/172,808 filed on Oct. 28, 2018. The contents of the above applications are all incorporated by reference as if fully set forth herein in their entirety.

FIELD AND BACKGROUND

The present invention, in some embodiments thereof, relates to anomaly detection and, more specifically, but not exclusively, to detecting anomalous actions of nodes of a network.

Anomalous actions within a computer network may be based on identified data that does not conform to an expected pattern. Anomalous actions may be indicative of a problem, or may be indicative of unexpected actions that are not necessarily problematic or malicious.

SUMMARY

According to a first aspect, a method for identifying at least one node of a dynamic graph predicted to perform an anomalous action for adapting components of a network for ensuring availability of network resources for interactions between entities during a future time interval, comprises: providing a plurality of graphs each indicative of a respective sequential snapshot of a dynamic graph obtained over a historical time interval, wherein nodes of the plurality of graphs denote entities, and edges of the plurality of graphs denote interactions between the entities over a network, computing a plurality of community graphs according to the plurality of graphs, computing a plurality of meta-community graphs according to the plurality of community graphs, analyzing dynamics of the plurality of community graphs to detect changes between two temporally adjacent community graphs, analyzing dynamics of the plurality of meta-community graphs to detect changes between two temporally adjacent meta-community graphs, identifying at least one entity corresponding to at least one node of the dynamic graph according to a predicted likelihood of performing an anomalous action during a future time interval, and generating instructions in response to the predicted likelihood of performing an anomalous action during a future time interval and the identified at least one entity for adapting at least one component of the network for ensuring availability of network resources for interactions between entities during the future time interval.

According to a second aspect, a system for identifying at least one node of a dynamic graph predicted to perform an anomalous action for adapting components of a network for ensuring availability of network resources for interactions between entities during a future time interval, comprises: at least one hardware processor, and a non-transitory memory having stored thereon a code for execution by the at least one hardware processor, the code comprising instructions for: providing a plurality of graphs each indicative of a respective sequential snapshot of a dynamic graph obtained over a historical time interval, wherein nodes of the plurality of graphs denote entities, and edges of the plurality of graphs denote interactions between the entities over a network, computing a plurality of community graphs according to the plurality of graphs, computing a plurality of meta-community graphs according to the plurality of community graphs, analyzing dynamics of the plurality of community graphs to detect changes between two temporally adjacent community graphs, analyzing dynamics of the plurality of meta-community graphs to detect changes between two temporally adjacent meta-community graphs, and identifying at least one entity corresponding to at least one node of the dynamic graph according to a predicted likelihood of performing an anomalous action during a future time interval, and generating instructions in response to the predicted likelihood of performing an anomalous action during a future time interval and the identified at least one entity for adapting at least one component of the network for ensuring availability of network resources for interactions between entities during the future time interval.

According to a third aspect, a computer program product for identifying at least one node of a dynamic graph predicted to perform an anomalous action for adapting components of a network for ensuring availability of network resources for interactions between entities during a future time interval, comprises: a non-transitory memory having stored thereon a code for execution by at least one hardware processor, the code comprising instructions for: providing a plurality of graphs each indicative of a respective sequential snapshot of a dynamic graph obtained over a historical time interval, wherein nodes of the plurality of graphs denote entities, and edges of the plurality of graphs denote interactions between the entities over a network, computing a plurality of community graphs according to the plurality of graphs, computing a plurality of meta-community graphs according to the plurality of community graphs, analyzing dynamics of the plurality of community graphs to detect changes between two temporally adjacent community graphs, analyzing dynamics of the plurality of meta-community graphs to detect changes between two temporally adjacent meta-community graphs, and identifying at least one entity corresponding to at least one node of the dynamic graph according to a predicted likelihood of performing an anomalous action during a future time interval, and generating instructions in response to the predicted likelihood of performing an anomalous action during a future time interval and the identified at least one entity for adapting at least one component of the network for ensuring availability of network resources for interactions between entities during the future time interval.

At least some of the systems, methods, apparatus, and/or code instructions described herein improve the technical field of management of network components (e.g., network resources, including the network itself and/or entities using the network for interactions). The improvement may relate to ensuring sufficient network resources are available for interactions between entities in view of dynamic changes in interactions between entities over the network resources, according to identified entity (or entities) and/or the predicted likelihood of performing an anomalous action during a future time interval. Alternatively or additionally, the improvement may relate to adapting one or more parameters of the entities to ensure existing network resources remain sufficient in view of the predicted anomalous actions. The anomalous actions, which indicate a change in the interactions of the entities over the network infrastructure may be due to, for example, a change in interactions in individual entities that is aggregated into a group dynamic.

In one example where the anomalous action is indicative of transfer, the graph represents transfer of large multimedia data objects (e.g., videos requiring high bandwidth) between groups of user, for example one group likes to transfer videos and another group likes to stream live videos. The current transport network is sufficient to support the existing large amount of data for the different groups. In such case, the anomalous action may predict a change in the pattern of transfer of the large multimedia data objects between the users. For example, a group of users that normally like to transfer pre-recorded videos are predicted to move to the group of users that like to stream live videos. The existing network architecture may be insufficient to support the predicted change in data transfer patterns of the restructured groups. The generated instructions may be for a redesign of the network architecture to support the predicted change in data transfer patterns for the new groups.

In another example where the anomalous action is indicative of unification, the graph may represent interactions between client terminals and a secure server storing important data. One group of client terminals may be of authenticated users that are provided a secure access to the server, and another group of client terminals may be of unauthorized entities that are attempting to maliciously access the server. When the prediction indicates that both groups are about to unite into a single group, the prediction may be indicative that the malicious group is about to succeed in breaking through the existing security barriers. The instructions may be for changing the current security mechanism at each of the authorized client terminals to prevent the malicious client terminals from succeeding in gaining access to the secure server.

In another example where the anomalous action is indicative of splitting, the graph may represent users playing an online game hosted by a server with each other. The group may initially be considered as a cohesive group when different users play the same game hosted by the same server with one another. The prediction may indicate that the groups are about to split into two different groups, for example, groups that play at different times of the day, and/or groups of users from different geographical regions. The instructions may be for a re-balancing of the expected change in traffic to the server to accommodate the different groups. For example, another server may be set-up at a different geographical location, and/or the existing server may be geographically relocated, to handle traffic from the geographically distinct groups. In another example, additional network bandwidth may be purchased from the network infrastructure provided to accommodate predicted surges at peak times due to the predicted groups.

In yet another example where the anomalous action is indicative of unification, the graph may represent users accessing a smartcontract of a blockchain. Initially, different groups of users may be identified, for example, accessing the smartcontract from different geographical locations, different client terminals, and/or different times of the day. The prediction may indicate that the groups are about to unit into a single group, for example, that more users are likely to attempt to access the smartcontract at the same time. The instructions may be to prevent such unification of the group to avoid overloading the server(s) hosting the smartcontract. For example, messages may be sent to the client terminals indicating when each user is allowed to access the smartcontract, and/or incentives may be provided to users to maintain their current access of the smartcontract, and/or code that controls access to the smartcontract may be sent for local installation on the client terminals to prevent simultaneous access.

At least some of the systems, methods, apparatus, and/or code instructions described herein address the technical problem of identifying one or more nodes of a graph (i.e., where the nodes are indicative of entities, for example, user accounts, client terminals, and/or servers) according to a predicted likelihood of performing one or more anomalous actions. The anomalous actions may be, for example, unexpected actions (which may be normal), and/or malicious actions. Nodes that do not perform anomalous actions may denote stability. When the anomalous actions have not yet occurred, processes may be initiated accordingly, for example, to prevent the anomalous action from occurring, and/or trigger performance of the anomalous action such as directing the node to perform the action.

It is noted that the anomalous actions may be based on actions that are not expected and/or have a relatively low likelihood of occurring (e.g., below a defined probability threshold) in stable networks and/or stable dynamic graphs.

The entities represented by nodes of the graph may be related to human users, for example, a user account accessed by a user, a client terminal accessed by a user, and/or an application accessed by a user. In such cases, the anomalous actions may be indicative of underlying behavior of the human users. The anomalous actions may be indicative of malicious actions performed by the human users via the entities (e.g., user account, client terminal, application), and/or the anomalous actions may be indicative of unexpected actions performed by the human users via the entities. Entities associated with likelihood of performing the anomalous action in the future may be targeted, for example, with automated processed designed to avoid the entity from performing the anomalous action (e.g., predicted malicious activity), and/or guide the entity to perform a second target action(s) according to the anomalous action (e.g., perform a target action a target entity). The second target action(s) may be guided to be performed prior to the anomalous action(s) and/or simultaneously with the anomalous action(s) (e.g., the execution of the anomalous action(s) is anticipated).

Existing machine learning processes and/or predictive analytics processes take raw data, learn the internal statistics and regularities within the raw data, and then predict anomalies and/or detect anomalies. However, such existing processes lose the information associated with interplay and connectivity between different entities, in particular dynamics of interactions between entities. In particular, existing network-theory-based computations and predictions are limited to static networks and flow dynamics, which reduces the efficiency and/or accuracy of possible predictions and anomalous detection. In contrast, at least some of the systems, methods, apparatus, and/or code instructions described herein consider the dynamics of the network, in particular, the dynamics of interactions between entities, to predict likelihood of future anomalous actions taken by entities. Moreover, at least some of the systems, methods, apparatus, and/or code instructions described herein analyze composition of communities and meta-communities within an evolving network. At least some of the systems, methods, apparatus, and/or code instructions described herein relate to connected groups of entities (e.g., community in a graph) as a dynamic entity which changes and evolves over time. The connectivity and/or restructuring of the communities and/or meta-communities are analyzed, and future dynamics are predicted. The predictions enable detection of anomalous actions of entities (e.g., communities, such as groups of entities). Such entities likely to perform anomalous actions may not necessarily be detected by other existing processes, and/or the accuracy of the prediction may be increased.

The identified and/or predicted community graph restructuring (e.g., splitting, unification) and transfer between meta-communities may be indicative of certain events, and may be used to trigger automated processed accordingly (e.g., according to a set of rules). For example, a transfer between meta-communities may indicate that user accounts have changed their affiliation from one group to another. User accounts may be targeted to encourage the change in affiliation, or discourage the change. Unification of two or more communities into a single community may indicate that user accounts that were once considered under different categories or classification may now be considered as one group. The entire group may be targeted for performing the same target action, rather than targeting each category differently. Splitting of one community into two or more communities may indicate that a group of entities considered to be cohesive suddenly acts as two different groups. The two groups may be targeted with different target actions rather than the same action for the whole group, for example, targeted differently for advertising.

At least some of the systems, methods, apparatus, and/or code instructions described herein improve the technical field of monitoring a computer network and/or dataset denoting connected entities (e.g., user accounts, client terminals) to detect anomalous actions, by predicting nodes likely to perform the anomalous actions before the anomalous actions have occurred.

In a further implementation form of the first, second, and third aspects, the generated instructions are selected from the group consisting of: preventing the at least one entity from performing the prediction anomalous action, performing the predicted anomalous action earlier than the future time interval, performing another target action prior to the predicted anomalous action being performed by the at least one entity, and performing the anomalous action by another entity prior to the at least one entity performing the predicted anomalous action.

In a further implementation form of the first, second, and third aspects, each respective community graph is computed according to each respective graph, each respective community graph including community nodes computed by assigning each node of each respective graph to one community node of the respective community graph.

In a further implementation form of the first, second, and third aspects, each respective meta-community graph is computed according to each respective community graph, each respective meta-community graph comprising a plurality of meta-community nodes, wherein each community node of each respective community graph is assigned to one meta-community node, wherein weights between meta-community nodes are proportional to a number of edges between corresponding community nodes.

In a further implementation form of the first, second, and third aspects, the changes between two temporally adjacent community graphs include at least one of: a change in a weight between community nodes, and a change in structure of community nodes.

In a further implementation form of the first, second, and third aspects, the changes between two temporally adjacent meta-community graphs include a transfer of communities between meta-community nodes.

In a further implementation form of the first, second, and third aspects, the predicted likelihood of performing the anomalous action is computed according to the analyzed dynamics of the plurality of community graphs and the analyzed dynamics of the plurality of meta-community graphs.

In a further implementation form of the first, second, and third aspects, the anomalous action predicted to be performed by the identified at least one node is selected from the group consisting of: being a member of a community that split off from another community, being a member of a community that merged with another community, and being a member of a community that transferred between meta-communities.

In a further implementation form of the first, second, and third aspects, temporally adjacent graphs of the plurality of graphs overlap in at least one common node, and each graph of the plurality of graphs has a unique combination of nodes and edges that is not present in any other graph.

In a further implementation form of the first, second, and third aspects, the graphs are computed according to at least one dataset, wherein nodes of the graphs denote entities of records of the at least one dataset, and edges of the graphs denote interactions between entities of the records of the at least one dataset.

In a further implementation form of the first, second, and third aspects, entities are selected from the group consisting of: user accounts, wallets, social network accounts, bank accounts, shopping accounts, email accounts, gaming application, blockchain user accounts, mobile device, smartphone, standard phones, servers, applications being used by the user, and client terminals, and interactions are selected from the group consisting of: calls, multimedia objects sent from one entity to another entity, financial transactions, a game played by two or more entities, transactions associated with smart contracts, and transfer of blockchain-based tokens or cryptocurrencies.

In a further implementation form of the first, second, and third aspects, the communities of each respective community graph of the plurality of community graphs are computed according to an initial community seed according to the communities computed for the previous community graph.

In a further implementation form of the first, second, and third aspects, the change in weight between communities is selected from the group consisting of: increase in weight, decreasing in weight, or disappearance of the weight.

In a further implementation form of the first, second, and third aspects, the change in structure of community nodes is selected from the group consisting of: appearance of a new community node, disappearance of a previously existing community node, split of a single existing community node into two or more communities, and unification of two or more communities into a single community.

In a further implementation form of the first, second, and third aspects, the predicted likelihood of performing the anomalous action is computed according to a predicted likelihood of unification of two or more communities into a single community, wherein the identified at least one entity corresponding to the at least one node is a member of one of the two or more communities unified into the single community.

In a further implementation form of the first, second, and third aspects, the unification of two or more communities into the single community is predicted for the future time interval according to change in weight between the two or more communities computed over the historical time interval.

In a further implementation form of the first, second, and third aspects, the change in weight comprises a computed trend indicative of relative increase in weight over a plurality of temporally sequential community graphs.

In a further implementation form of the first, second, and third aspects, the predicted likelihood of performing the anomalous action is computed according to a predicted likelihood of transfer of one community between two meta-communities.

In a further implementation form of the first, second, and third aspects, the predicted likelihood of transfer of one community between two meta-communities is computed according to change in weight between the one community and each of the two meta-communities.

In a further implementation form of the first, second, and third aspects, the transfer of one community from a first meta-community to a second meta-community of the two meta-communities is predicted according to computed pattern indicative of an increase in the weight between the one community and the second meta-community and a decrease in the weight between the one community and the first meta-community over a plurality of temporally sequentially meta-community graphs.

In a further implementation form of the first, second, and third aspects, the predicted likelihood of performing the anomalous action is computed by extrapolating the analyzed dynamics of the plurality of community graphs and the meta-community graphs over the historical time interval into the future time interval.

In a further implementation form of the first, second, and third aspects, the extrapolation the analyzed dynamics comprises extrapolating weights between community nodes of a sequence of temporally adjacent community graphs over the historical time interval for predicting weights into the future time interval.

In a further implementation form of the first, second, and third aspects, the method further comprises and/or the system further comprises code instructions for and/or the computer program product further comprises additional instructions for predicting according to the predicted weights, at least one of: a change in structure of communities, and a transfer of communities between meta-communities, wherein the at least one entity corresponding to the at least one node identified according to the predicted likelihood of performing the anomalous action is a member of a community experiencing a structural change and/or a member of the community transferred between meta-communities.

In a further implementation form of the first, second, and third aspects, the predicted likelihood of performing an anomalous action is performed by a trained statistical classifier that is provided at least one of: a sequence of weights between community nodes of temporally adjacent community graphs, and a sequence of weights between meta-community nodes of temporally adjacent meta-community graphs, the statistical classifier trained on a training dataset including at least one of: a plurality of training sequences comprising weights between community nodes of temporally adjacent training community graphs, a plurality of training sequences of weights between meta-community nodes of temporally adjacent training meta-community graphs, and associated indication of training anomalous actions.

In a further implementation form of the first, second, and third aspects, the method further comprises and/or the system further comprises code instructions for and/or the computer program product further comprises additional instructions for detecting anomalous actions performed by at least one entity corresponding to the at least one node during the historical time interval.

In a further implementation form of the first, second, and third aspects, the predicted likelihood of performing the anomalous action is further computed according to at least one of a sequence of a plurality of meta-community parameters of meta-community nodes of sequential temporally adjacent meta-community graphs, and a sequence of a plurality of community parameters of community nodes of sequential temporally adjacent community graphs.

In a further implementation form of the first, second, and third aspects, the meta-community parameters are selected from the group consisting of: number of community nodes in respective meta-community nodes, and average degree, wherein the community parameters are selected from the group consisting of: number of nodes in respective community nodes, and average degree.

In a further implementation form of the first, second, and third aspects, the instructions are for providing targeted advertisements to the identified at least one entity.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
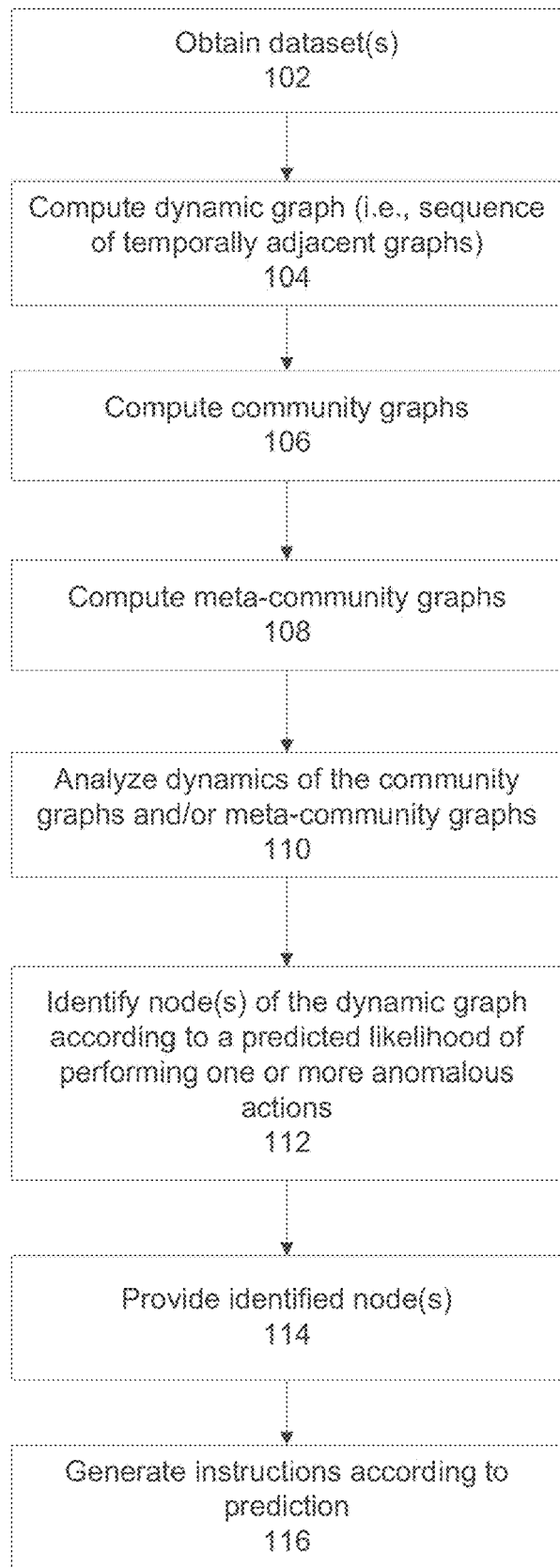
FIG. 1 is a flowchart of a method for identifying one or more nodes of a graph according to a predicted likelihood of the node(s) to perform an anomalous action, in accordance with some embodiments of the present invention.

The present invention, in some embodiments thereof, relates to anomaly detection and, more specifically, but not exclusively, to detecting anomalous actions of nodes of a network.

As used herein, the term temporally adjacent, or sequence of temporally adjacent refers to elements that are sequentially arranged in time, where a certain element appears at time t and a next element following the certain element appears at time t+delta. The elements may be, for example, graphs, community graphs, meta-community graphs, weights between nodes, parameters of nodes (e.g., of community nodes and/or meta-community nodes), as described herein.

As used herein, the term node may sometimes be interchanged with the term entity. Entities, which are represented by nodes of the graph, correspond to the nodes, as described herein. The identified node may refer to the entity corresponding to the node.

An aspect of some embodiments of the present invention relates to systems, an apparatus, methods, and/or code instructions (i.e., stored on a data storage device for execution by at least one hardware processor) for identifying node(s) of a dynamic graph according to a likelihood of the node(s) performing one or more anomalous actions during a future time interval. Components of a network may be adapted according to the identified node and/or predicted anomalous actions, for example, for ensuring availability of network resources for interactions between entities during a future time. Exemplary anomalous actions include being a member of a community that split off from another community, and being a member of a community that transferred between meta-communities. The dynamic graph is represented by multiple graphs, each indicative of a respective sequential snapshot of the dynamic graph obtained over a historical time interval. The dynamic graph may be computed from a dataset of records of interactions between entities, where nodes of the dynamic graph denote entities and edges denote interactions between the entities. Exemplary entities include: user accounts, client terminal, and applications. Entities may be used by human users to generate interactions between entities of the users, for example, transactions between user accounts, transfer of blockchain-based tokens or cryptocurrencies between accounts (e.g., wallets), sending multimedia objects between social network accounts, and performing financial transactions from bank accounts. Community graphs are computed according to respective graphs. Each respective community graph includes community nodes computed by assigning each node of the corresponding graph to one community node. Multiple meta-community graphs are computed according to respective community graphs. Each respective meta-community graph includes meta-community nodes, where each community node of each corresponding community graph is assigned to one meta-community node. Weights of edges between meta-community nodes are proportional to a number of edges between corresponding community nodes. Dynamics of the community graphs are analyzed to detect changes between two temporally adjacent community graphs. The changes include: a change in a weight between community nodes, and/or change in structure of community nodes. The change in structure may be a split of one community node into two or more community nodes, or merging of two or more community nodes into a single community node. Dynamics of the meta-community graphs are analyzed to detect changes between two temporally adjacent meta-community graphs. The changes including a transfer of one or more community node from one meta-community nodes to another meta-community node. One or more nodes of the dynamic graph are identified according to a predicted likelihood of performing one or more of the anomalous action during a future time interval. The predicted likelihood of performing the anomalous action(s) is computed according to the analyzed dynamics of the plurality of community graphs and/or the analyzed dynamics of the plurality of meta-community graphs. For example, extrapolating a sequence of weights between meta-community nodes obtained from a sequence of temporally adjacent meta-community graphs, to predict future weights between the meta-communities. A decrease in weight of one edge with a corresponding increase in weight of another edge may indicate a likelihood of impending transfer of the community node from one meta-community (where the weight is decreasing) to another meta-community (where the weight is increasing).

Optionally, instructions are generated in response to the predicted anomalous actions and/or according to the identified entities corresponding to the node(s). The instructions may be for adapting one or more parameters of the entities (e.g. client terminals, applications, user accounts) and/or adapting one or more parameters of the network resources that provide the medium for interaction between the network entities, optionally to provide sufficient network resources for interactions between entities in view of the predicted anomalous actions. For example, load re-balancing of a server to ensure sufficient network resources in view of predicted anomalous actions.

The instructions may be generated for execution of one or more automated processes (e.g., code for execution by hardware processor(s)) and/or manual processes. Exemplary generated instructions include, for example, instructions for preventing the node(s) from performing the predicted anomalous action(s), instructions for the node(s) to perform the predicted anomalous action(s) earlier than when predicted, instructions for performing another action and/or process (e.g., automated and/or manual) prior to the predicted anomalous action(s) being performed by the node(s), and/or instructions for performing the anomalous action(s) by another process prior to the node(s) performing the at anomalous action(s). Examples of predictions and instructions are described below.

The instructions may be for sending targeted advertisements. For example, when one group of cellular data users is predicted to split into two groups, one group that prefers to use the cellular at night, and another group that prefers to use cellular data during the day, target advertisements may be sent to help ensure that network resources are sufficient to meet the network requirements of both users. For example, the advertisements may be to help encourage load balancing. For example, when the network load is lighter at night, advertisements may be sent to the day users to encourage the day users to use mobile data at night, for example, by offering reduced night rates.

At least some of the systems, methods, apparatus, and/or code instructions described herein improve the technical field of management of network components (e.g., network resources, including the network itself and/or entities using the network for interactions). The improvement may relate to ensuring sufficient network resources are available for interactions between entities in view of dynamic changes in interactions between entities over the network resources, according to identified entity (or entities) and/or the predicted likelihood of performing an anomalous action during a future time interval. Alternatively or additionally, the improvement may relate to adapting one or more parameters of the entities to ensure existing network resources remain sufficient in view of the predicted anomalous actions. The anomalous actions, which indicate a change in the interactions of the entities over the network infrastructure may be due to, for example, a change in interactions in individual entities that is aggregated into a group dynamic.

In one example where the anomalous action is indicative of transfer, the graph represents transfer of large multimedia data objects (e.g., videos requiring high bandwidth) between groups of user, for example one group likes to transfer videos and another group likes to stream live videos. The current transport network is sufficient to support the existing large amount of data for the different groups. In such case, the anomalous action may predict a change in the pattern of transfer of the large multimedia data objects between the users. For example, a group of users that normally like to transfer pre-recorded videos are predicted to move to the group of users that like to stream live videos. The existing network architecture may be insufficient to support the predicted change in data transfer patterns of the restructured groups. The generated instructions may be for a redesign of the network architecture to support the predicted change in data transfer patterns for the new groups.

In another example where the anomalous action is indicative of unification, the graph may represent interactions between client terminals and a secure server storing important data. One group of client terminals may be of authenticated users that are provided a secure access to the server, and another group of client terminals may be of unauthorized entities that are attempting to maliciously access the server. When the prediction indicates that both groups are about to unite into a single group, the prediction may be indicative that the malicious group is about to succeed in breaking through the existing security barriers. The instructions may be for changing the current security mechanism at each of the authorized client terminals to prevent the malicious client terminals from succeeding in gaining access to the secure server.

In another example where the anomalous action is indicative of splitting, the graph may represent users playing an online game hosted by a server with each other. The group may initially be considered as a cohesive group when different users play the same game hosted by the same server with one another. The prediction may indicate that the groups are about to split into two different groups, for example, groups that play at different times of the day, and/or groups of users from different geographical regions. The instructions may be for a re-balancing of the expected change in traffic to the server to accommodate the different groups. For example, another server may be set-up at a different geographical location, and/or the existing server may be geographically relocated, to handle traffic from the geographically distinct groups. In another example, additional network bandwidth may be purchased from the network infrastructure provided to accommodate predicted surges at peak times due to the predicted groups.

In yet another example where the anomalous action is indicative of unification, the graph may represent users accessing a smartcontract of a blockchain. Initially, different groups of users may be identified, for example, accessing the smartcontract from different geographical locations, different client terminals, and/or different times of the day. The prediction may indicate that the groups are about to unit into a single group, for example, that more users are likely to attempt to access the smartcontract at the same time. The instructions may be to prevent such unification of the group to avoid overloading the server(s) hosting the smartcontract. For example, messages may be sent to the client terminals indicating when each user is allowed to access the smartcontract, and/or incentives may be provided to users to maintain their current access of the smartcontract, and/or code that controls access to the smartcontract may be sent for local installation on the client terminals to prevent simultaneous access.

At least some of the systems, methods, apparatus, and/or code instructions described herein address the technical problem of identifying one or more nodes of a graph (i.e., where the nodes are indicative of entities, for example, user accounts, client terminals, and/or servers) according to a predicted likelihood of performing one or more anomalous actions. The anomalous actions may be, for example, unexpected actions (which may be normal), and/or malicious actions. Nodes that do not perform anomalous actions may denote stability. When the anomalous actions have not yet occurred, processes may be initiated accordingly, for example, to prevent the anomalous action from occurring, and/or trigger performance of the anomalous action such as directing the node to perform the action.

It is noted that the anomalous actions may be based on actions that are not expected and/or have a relatively low likelihood of occurring (e.g., below a defined probability threshold) in stable networks and/or stable dynamic graphs.

The entities represented by nodes of the graph may be related to human users, for example, a user account accessed by a user, a client terminal accessed by a user, and/or an application accessed by a user. In such cases, the anomalous actions may be indicative of underlying behavior of the human users. The anomalous actions may be indicative of malicious actions performed by the human users via the entities (e.g., user account, client terminal, application), and/or the anomalous actions may be indicative of unexpected actions performed by the human users via the entities. Entities associated with likelihood of performing the anomalous action in the future may be targeted, for example, with automated processed designed to avoid the entity from performing the anomalous action (e.g., predicted malicious activity), and/or guide the entity to perform a second target action(s) according to the anomalous action (e.g., perform a target action a target entity). The second target action(s) may be guided to be performed prior to the anomalous action(s) and/or simultaneously with the anomalous action(s) (e.g., the execution of the anomalous action(s) is anticipated).

Existing machine learning processes and/or predictive analytics processes take raw data, learn the internal statistics and regularities within the raw data, and then predict anomalies and/or detect anomalies. However, such existing processes lose the information associated with interplay and connectivity between different entities, in particular dynamics of interactions between entities. In particular, existing network-theory-based computations and predictions are limited to static networks and flow dynamics, which reduces the efficiency and/or accuracy of possible predictions and anomalous detection. In contrast, at least some of the systems, methods, apparatus, and/or code instructions described herein consider the dynamics of the network, in particular, the dynamics of interactions between entities, to predict likelihood of future anomalous actions taken by entities. Moreover, at least some of the systems, methods, apparatus, and/or code instructions described herein analyze composition of communities and meta-communities within an evolving network. At least some of the systems, methods, apparatus, and/or code instructions described herein relate to connected groups of entities (e.g., community in a graph) as a dynamic entity which changes and evolves over time. The connectivity and/or restructuring of the communities and/or meta-communities are analyzed, and future dynamics are predicted. The predictions enable detection of anomalous actions of entities (e.g., communities, such as groups of entities). Such entities likely to perform anomalous actions may not necessarily be detected by other existing processes, and/or the accuracy of the prediction may be increased.

The identified and/or predicted community graph restructuring (e.g., splitting, unification) and transfer between meta-communities may be indicative of certain events, and may be used to trigger automated processed accordingly (e.g., according to a set of rules). For example, a transfer between meta-communities may indicate that user accounts have changed their affiliation from one group to another. User accounts may be targeted to encourage the change in affiliation, or discourage the change. Unification of two or more communities into a single community may indicate that user accounts that were once considered under different categories or classification may now be considered as one group. The entire group may be targeted for performing the same target action, rather than targeting each category differently. Splitting of one community into two or more communities may indicate that a group of entities considered to be cohesive suddenly acts as two different groups. The two groups may be targeted with different target actions rather than the same action for the whole group, for example, targeted differently for advertising.

At least some of the systems, methods, apparatus, and/or code instructions described herein improve the technical field of monitoring a computer network and/or dataset denoting connected entities (e.g., user accounts, client terminals) to detect anomalous actions, by predicting nodes likely to perform the anomalous actions before the anomalous actions have occurred.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
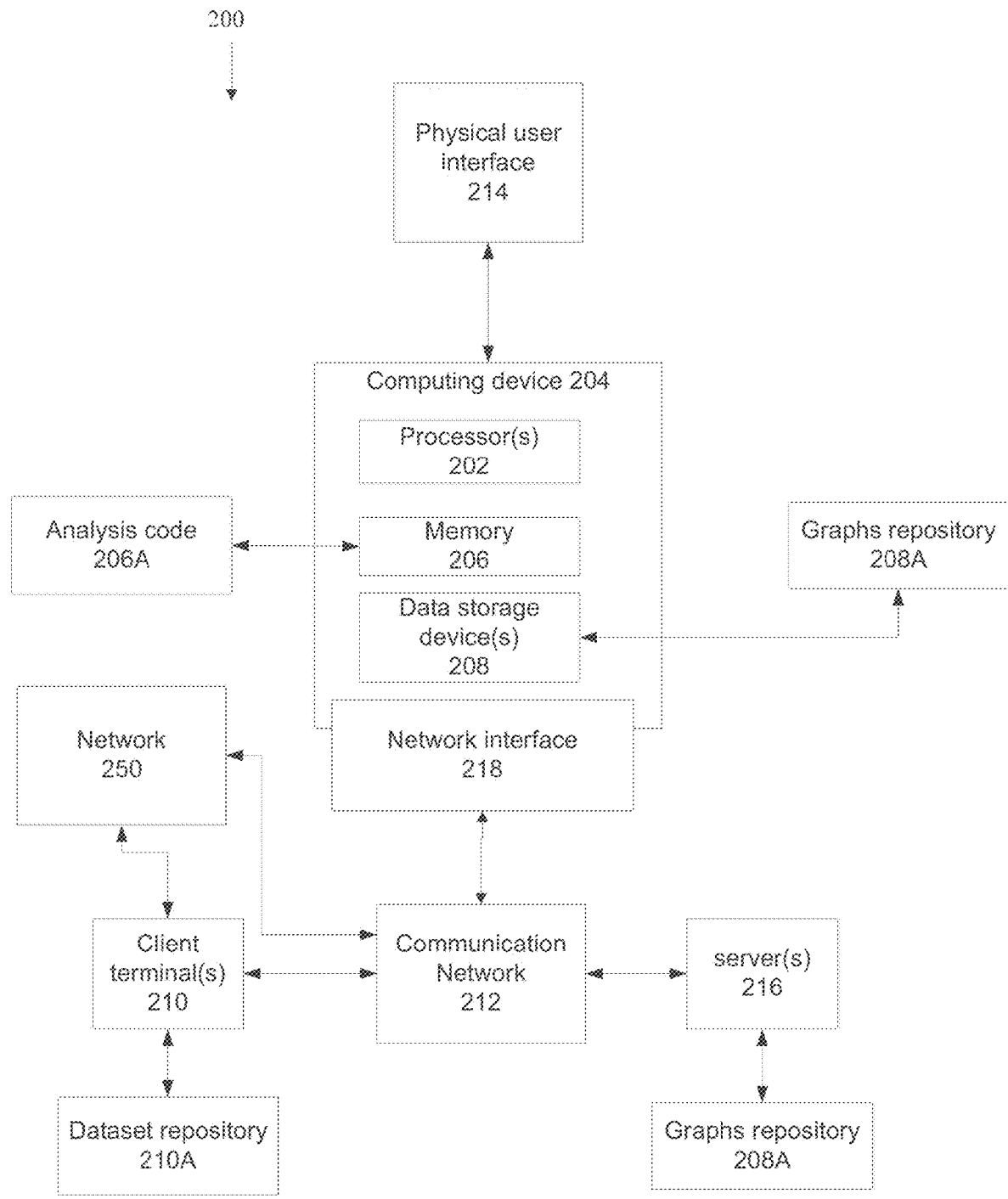
FIG. 2 is a block diagram of components of a system for identifying one or more nodes of a graph according to a predicted likelihood of the node(s) to perform an anomalous action, in accordance with some embodiments of the present invention.

Reference is now made to FIG. 1, which is a flowchart of a method for identifying one or more nodes of a graph according to a predicted likelihood of the node(s) to perform an anomalous action, in accordance with some embodiments of the present invention. Reference is also made to FIG. 2, which is a block diagram of components of a system 200 for identifying one or more nodes of a graph according to a predicted likelihood of the node(s) perform an anomalous action, in accordance with some embodiments of the present invention. System 200 may implement the acts of the methods described with reference to FIG. 1, by processor(s) 202 of a computing device 204 executing code instructions (e.g., code 206A) stored in a memory 206 (also referred to as a program store).

Computing device 204 may be implemented as, for example one or more and/or combination of: a group of connected devices, a client terminal, a server, a virtual server, a computing cloud, a virtual machine, a desktop computer, a thin client, a network node, a network server executing code of a smart contract stored on a blockchain, and/or a mobile device (e.g., a Smartphone, a Tablet computer, a laptop computer, a wearable computer, glasses computer, and a watch computer).

Multiple architectures of system 200 based on computing device 204 may be implemented. For example:

Computing device 204 may be implemented as one or more servers (e.g., network server, web server, a computing cloud, a virtual server, a network node storing a blockchain and executing code of a smart contract stored on the blockchain) that provides services to multiple client terminals 210 over a communication network 212, for example, software as a service (SaaS), remote services, and/or services executed by a smart contract of a blockchain paid for by cryptocurrency. Computing device 204 receives datasets (e.g., stored in dataset repository 210A) and/or graphs (stored in graph repository 208A) from multiple client terminals 210 over communication network 212. Dataset may be computed from a network 250, as described herein. The graphs may be computed by computing device 204 when client terminal(s) 210 provide the datasets. Alternatively, the graphs are computed by the client terminal(s) from the dataset and provided to computing device 204. The node(s) identified according to a predicted likelihood of performing abnormal action(s) are computed by computing device 204, and provided to the corresponding client terminal 210 over network 212.

Communication between client terminal(s) 210 and computing device 204 over network 212 may be implemented, for example, via an application programming interface (API), software development kit (SDK), functions and/or libraries and/or add-ons added to existing applications executing on client terminal(s), an application for download and execution on client terminal 210 that communicates with computing device 204, function and/or interface calls to smart contract code of a blockchain executed by computing device 204, a remote access section executing on a web site hosted by computing device 204 accessed via a web browser executing on client terminal(s) 210.

Graphs (e.g., stored in graph repository 208A) may be computed by server(s) 216 based on dataset(s) (e.g., stored in dataset repository 210A) provided by client terminal(s) 210 over network 212. Graphs and/or dataset(s) are computed based on an analysis of entities and/or interactions between entities of network 250, as described herein. The graphs may be provided from server(s) 216 to computing device 204 over communication network 212. The node(s) identified according to a predicted likelihood of performing abnormal action(s) are computed by computing device 204, and provided to the corresponding client terminal 210 over network 212.

Computing device 204 may be implemented as a standalone device (e.g., kiosk, client terminal, smartphone, server, computing cloud, virtual machine) that includes locally stored code that implement one or more of the acts described with reference to FIG. 1. For example, code loaded on to an existing computing device that executes an application that computes the graphs based on the dataset of records, and/or code loaded onto a dedicated server (e.g., of a same organization) that is connected to client terminal 210 via network 212, where only client terminal 210 (or other client terminals 210 of the same organization) store and/or generate the dataset of records and/or compute the graphs. The node(s) identified according to a predicted likelihood of performing abnormal action(s) are computed by computing device 204. The identified node(s) may be presented on a display, and/or automated actions may be executed in response to the identified node(s). In such implementation, communication with client terminal(s) 210 and/or sever(s) 216 and/or network 212 is not necessarily required.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIG. 1 when executed by hardware processor(s) 202.

Computing device 204 may include data storage device(s) 208 for storing data, for example, graph repository 208A that stores the computed dynamic graph, graphs of nodes, community graphs, and/or meta-community graphs, and/or stores dataset repository 210A which is used to compute the graphs of the dynamic graph. Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Communication network 212 may be implemented as, for example, the internet, a local area network, a virtual network, a wireless network, a cellular network, a local bus, a point to point link (e.g., wired), and/or combinations of the aforementioned. It is noted that entities and/or components of network 250 may include and/or use network 212, for example, network 250 may denote client terminals communicating with one another over communication network 212. Alternatively, network 250 is independent of communication network 212, for example, when denoting transactions between financial accounts of a bank server.

Computing device 204 may include a network interface 218 for connecting to network 212, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 and/or server(s) 216 include and/or are in communication with one or more physical user interfaces 214 that include a mechanism for user interaction, for example, to designate the dataset used to compute the graphs, and/or view the nodes predicted as likely to perform abnormal action(s). Exemplary physical user interfaces 214 include, for example, one or more of, a touchscreen, a display, gesture activation devices, a keyboard, a mouse, and voice activated software using speakers and microphone.

Client terminal(s) 210 and/or server(s) 216 may be implemented as, for example, as a desktop computer, a server, a virtual server, a network server, a web server, a virtual machine, a thin client, and a mobile device.

Referring now back to FIG. 1, at 102, one or more datasets are obtained, for example, by the computing device. Datasets may be obtained from respective client terminals and/or respective servers. The dataset(s) include records obtained over a historical time interval.

A single dataset including time stamped records may be obtained. Alternatively or additionally, multiple datasets are obtained, where records of the dataset are obtained during a single time interval, for example, as a snapshot. Multiple snapshots of the same dataset may be obtained over time, where each snapshot is obtained during a different time and represents the historical state of the dynamics of the dataset at the respective historical time.

Each dataset includes multiple records for respective entities. Each record may store values of parameters, and optionally an associated indication of the respective entity.

The datasets may be computed based on an analysis of the records of the entities, optionally denoting interactions between the entities.

Entities (e.g., of network 250) may represent, for example, virtual and/or physical entities used by individuals (i.e., human users), for example, user accounts (e.g., social network accounts, bank accounts, shopping accounts, email accounts, gaming application, wallets, blockchain user accounts), client terminals, mobile device, smartphone (and/ or standard phones), servers, and applications being used by the user (e.g., email application, game application, online shopping application, banking application, currency transfer application).

Records stored by the dataset may include interactions and/or transactions (e.g., of network 250) optionally between entities (e.g., of network 250), for example, sending of multimedia objects (e.g., images, videos, text) from one user to another, a phone call by an originating entity to a receiving entity, adding another entity (e.g., user account) to a social network of a current entity, a game being played by two or more entities, an email or other message sent from one entity to another entity, transactions associated with a smart contract of a blockchain, and financial transactions (e.g., transfer of currency from one entity to another entity). Each transaction may be stored as a record. Each exemplary transaction record may store: an ID of the transaction participants, for example sender and receiver (e.g., seller and buyer, or originator of multimedia object and receiver of the multimedia object, entity that added another entity as a link to their social network), value of the transaction, and optionally additional data of the entities (e.g., of the human individuals associated with the entities), for example gender, age, income, geographic location, and ethnicity.

It is noted that components of network 250 may include the entities described herein and/or other network components (e.g., of communication network 212 and/or another network) used by entities for interactions.

At 104, a sequence of temporally adjacent (i.e., time sequenced) graphs (also referred to herein as graphs) are provided, for example, to the computing device. The graphs are based on the datasets. The graphs may be computed according to the datasets, for example, by the computing device, by the respective client terminal and/or server that provided the dataset, and/or by another computing device (e.g., application hosted by a server that computes graphs in response to inputted dataset).

Multiple graphs are provided and/or computed for the historical time interval. Each graph represents a respective sequential snapshot of a dynamic graph obtained over the historical time interval. The dynamic graph represents the changes occurring within the dataset over the historical time interval, where each graph represents a snapshot in time of the state of the dynamic graph.

Nodes of the graphs represent entities of the dataset. Edges of the nodes of the graphs represent interactions between the entities, for example, transactions occurring between the nodes. The edges may be directed, indicating the direction of the transfer occurring during the transaction, for example, from sending entity to receiving entity.

The graphs may include a unique combination of nodes and edges. For example, each of the graphs has a unique combination of nodes and edges not present in any other graph. The unique combination of nodes and edges of the respective graph represent dynamic changes of the dynamic graph (i.e., based on the dynamic changes of the dataset) over the historical time interval. The graphs overlap in one or more common nodes. Each common node appears at least in two or more temporally adjacent graphs (i.e., sequential graphs, where the first graph appears at time t and the next graph following the first graph appears at time t+delta). Edges of the common nodes may vary between the graphs having the same common nodes.

At 106, a respective community graph is computed for each of the graphs (i.e., the temporally arranged graphs). Multiple community graphs are computed corresponding to the multiple graphs over the historical time interval.

The nodes of the community graph, denoting respective communities of the community graph, may be referred to herein as community nodes, or communities. The community nodes may refer to implementations in which the nodes of the community graph are each assigned to respective communities. The community node refers to the aggregation of all nodes assigned to the same community.

Each node of each respective graph is assigned to one community (i.e., one community node) of the multiple communities of the corresponding community graph.

Community graphs may be computed from graphs, for example, by computing community structures from the graphs and arranging the community structures into community graphs as described with reference to Reichardt J, Bornholdt S (2006) *Statistical mechanics of community detection. Phys Rev E* 74(1):016110+. doi:10.1103/PhysRevE.74.016110, the contents of which are incorporated herein by reference in their entirety.

Weights between community nodes are proportional to the number of edges between the nodes denoted by respective community node. For example, a community graph that includes an edge of weight 5 between two community nodes may denote that there are two communities, with five edges between nodes of one community and nodes of the other community. The link may be represented as A-5-B, where A and B denote the community nodes, and 5 denoting the weight of the edge between the community nodes A and B.

Community graphs may be tagged by assignment of labels (e.g., via metadata, and/or a tag field added to a dataset structure storing the structure of the community graph). Community labels may be assigned for each certain node in the respective graph, based on connectivity of the certain node to other nodes of the graph. Nodes with the same label are part of the same community. Nodes with different labels are part of different communities. In principle, nodes within the same community are more connected one to another, than with nodes from different communities. An exemplary process for computing connectivity between nodes and a community structure for computation of a community graph is described, for example, with reference to Traag, Vincent. *Algorithms and dynamical models for communities and reputation in social networks*. Springer, 2014.

Optionally, each community node of the community graph is characterized by one or more selected parameters, for example, size (e.g., number of constituent nodes of the graph represented by the respective community node), average degree, and the like. The parameters may be stored in associated with the community node.

Optionally, the communities of each respective community graph are computed according to an initial community seed. The initial community seed is determined according to the communities computed for the previous community graph, i.e., the community graph located relatively earlier than the respective community graph during the historic time interval, and/or the community graph located sequentially soon during the historic time interval than the respective community graph. The initial community seed may be the label community label assigned to each node of the graph. Using the communities of the previous graph as seeds increases the probability of maximum continuity of the communities. The initial community seed based on the communities of the previous graph is based on the assumption that the dynamic graph does not change drastically during the amount of time elapsed between the sequential graphs.

It is noted that using the communities of the earlier community graph as the initial community seed for computing the next sequential community graph is in contrast to existing community detection processes, for example, as described with reference to Traag, Vincent. *Algorithms and dynamical models for communities and reputation in social networks*. Springer, 2014. Such known community detection processed are optimization algorithms based on iterations that require an initial seed for the community. The seed is usually random.

At 108, a respective meta-community graph is computed for each of the community graphs. Multiple meta-community graphs are computed corresponding to the multiple community graphs over the historical time interval.

The nodes of the meta-community graph, denoting respective meta-communities of the meta-community graph, may be referred to herein as meta-community nodes, or meta-communities. The meta-community nodes may refer to implementations in which the community nodes of the meta-community graph are each assigned to respective meta-communities. The meta-community node refers to the aggregation of all community nodes assigned to the same meta-community.

Each community node of each respective community graph is assigned to one meta-community (i.e., one meta-community node) of the multiple meta-communities of the corresponding meta-community graph.

Meta-communities may be computed from communities using the same process used to compute communities from nodes of the graphs. Alternatively, the implemented process for computing meta-communities from communities is different than the implemented process for computing communities from nodes.

Weights between meta-community nodes are proportional to the number of edges between the community nodes denoted by respective meta-community node.

Meta-community graphs may be tagged by assignment of labels (e.g., via metadata, and/or a tag field added to a dataset structure storing the structure of the meta-community graph). Meta-community labels may be assigned for each certain community node in the respective community graph, based on connectivity of the certain community node to other community nodes of the community graph. Community nodes with the same label are part of the same meta-community. Community nodes with different labels are part of different meta-communities. In principle, community nodes within the same meta-community are more connected one to another, than with community nodes from different meta-communities.

Optionally, each meta-community node of the meta-community graph is characterized by one or more selected parameters, for example, size (e.g., number of constituent community nodes represented by the respective meta-community node), average degree, and the like. The parameters may be stored in associated with the meta-community node.

At 110, dynamics of the meta-community graphs are analyzed to detect changes between two temporally adjacent meta-community graphs. Alternatively or additionally, dynamics of the community graphs are analyzed to detect changes between two temporally adjacent community graphs.

Optionally, each pair of adjacent community graphs and/or adjacent meta-community graphs is analyzed over the historical time interval.

Exemplary changes between temporally adjacent community graphs and/or temporally adjacent meta-community graphs include one or more of:

Change(s) in weight(s) between communities (i.e., community nodes) of the two temporally adjacent community graphs, for example, an increase in the weight of the edge between the community nodes, a decrease in the weight of the edge between the two community nodes, or disappearance of the weight of the edge between the two community nodes. Increase in weight denotes more connections between nodes of the communities. Decrease in weight denotes fewer connections between nodes of the communities. Disappearance of the weight denotes disappearance of connections between nodes of the communities.

Change(s) in weight(s) between meta-communities (i.e., meta-community nodes) of the two temporally adjacent meta-community graphs, for example, an increase in the weight of the edge between the two meta-community nodes, a decrease in the weight of the edge between the two meta-community nodes, or disappearance of the weight of the edge between the two meta-community nodes. Increase in weight denotes more connections between communities of the meta-communities. Decrease in weight denotes fewer connections between communities of the meta-communities. Disappearance of the weight denotes disappearance of connections between communities of the meta-communities.

Change(s) in structure of communities, for example, appearance of a new community, disappearance of a previously existing community, split of a single existing community into two or more communities, and unification of two or more communities into a single community.

A split of a single existing community into two or more communities may be denoted as A→B-C, where A is the single community, and B-C are the two communities created by the splitting of A. The two communities created by the splitting of A may have a connective edge, optionally assigned a weight. For example, a community an historical time t, has split to two (or more) communities at historical time t+1, for example a-b-c-d→a-b, c-d, where a-b-c-d are nodes of community A, a-b are nodes of community B, and c-d are nodes of community C.

A unification of two or more communities into a single community may be denoted as A-B→C, where A-B are the two communities, and C is the single community created by the unification. A and B may have a common edge with optionally a corresponding weight. Optionally, the weight of the edge between the two communities has strengthened such that the two communities become one indistinguishable community.

Change(s) in structure of meta-communities, for example, appearance of a new meta-community, disappearance of a previously existing meta-community, split of a single existing meta-community into two or more meta-communities, and unification of two or more meta-communities into a single meta-community.

A transfer of nodes between community nodes.

A transfer of community nodes between meta-community nodes. The transfer of community nodes between two or more meta-communities may be denoted for example as [A,B]/[C,D]→[A]/[B,C,D], where A,B,C,D denote community nodes, square brackets [ ] denote meta-community members having community members according to the communities indicated within the square brackets. In other words, a first community has loosened its edges with a second community and strengthened edges with a third community, thus moving from the meta-community that includes the second community to another meta-community that includes the third community.

At 112, one or more node of the dynamic graph (i.e., of the multiple graphs) is identified according to a predicted likelihood of performing an anomalous action(s) during a future time interval. The predicted likelihood of performing the anomalous action(s) is computed according to the analyzed dynamics of the community graphs and/or the analyzed dynamics of the meta-community graphs. Exemplary anomalous actions include: the respective node being a member of a community that split off from another community, and the respective node being a member of a community that transferred between meta-communities.

The predicted likelihood of performing the anomalous action(s) may be determined according to a predefined probability threshold (or other requirement, such as range). Anomalous action(s) associated with probability of occurring above the threshold may be identified. Anomalous action(s) associated with probability of occurring below the threshold may be ignored or otherwise no selected. The predefined probability threshold may be selected, for example, based on likelihood of the anomalous action(s) occurring in a dynamic graph (e.g., network) that reached a stable state, and/or based on a manual user selection and/or obtained from a memory storing preset values, and/or based on automated code that selects the threshold according to the automated processed triggered in response to the anomalous action(s) and/or selected according to other methods.

Optionally, the predicted likelihood of performing the anomalous action is computed according to a predicted likelihood of unification of two or more communities into a single community. The identified node(s) is a member of one or the two or more communities unified into the single community. Optionally, the unification of the two or more communities into the single community is predicted for the future time interval according to change(s) in weight(s) between the two or more communities computed over the historical time interval. The change in weight may be identified according to a trend (e.g., sequence of temporally adjacent weights) indicative of a relative increase in weight over multiple temporally adjacent and sequential community graphs (e.g., pairs of consecutive community graphs). In other words, community-community weight increase may indicate and predict the unification of the two or communities into a single community. Alternatively or additionally, when the unification of two or more communities into the single community is identified for the historical time interval, the splitting of the single community into the original (or another) two or more communities may be predicted for a future time interval. The predicted splitting may be computed at least according to the pattern of the weight between the communities during the historic time interval. For example, for the mathematical representation: A-5-B→A-10-B→C(A-B)→ . . . –→A-10-B, the label C(A-B) denotes a new community C that is created from the members of original communities A and B. New community C is predicted to split back into original communities A and B.

Optionally, the predicted likelihood of performing the anomalous action is computed according to a predicted likelihood of transfer of one community between two meta-communities, i.e., the one community transfers from a first meta-community to a second meta-community. The predicted likelihood of transfer of one community between two meta-communities is computed according to a pattern (e.g., temporally adjacent sequence) of change of weights between the one community and each of two-meta communities. The pattern of changes in weights may be identified according to trends indicative a relative increase in the weight between the one community and a second meta-community and a decrease in the weight between the one community and a first meta-community for multiple pairs of temporally adjacent and sequential meta-community graphs (e.g., pairs of consecutive meta-community graphs). For example, the mathematical representation: [A-10-B]-2-[C-10-D]→[A-5-B]-5-[C-10-D]→[A]-2-[B-10-C-10-D], denotes that connectivity between communities A and B has decreased, whereas the B-C link has increased, resulting in a transfer of community B from the meta-community that previous included A and B to the other meta community which previous included C and D (and now include B, C and D).

Optionally, the predicted likelihood of performing the anomalous action is computed by extrapolating the analyzed dynamics of the meta-community graphs and/or the community graphs over the historical time interval into the future time interval.

Optionally, weights between community nodes computed for the sequence of temporally adjacent community graphs are extrapolated over the historical time interval for predicting weight into the future time interval. Alternatively or additionally, weights between meta-community nodes computed for the sequence of temporally adjacent meta-community graphs are extrapolated over the historical time interval for predicting weight into the future time interval. The change in structure of communities and/or transfer of communities between meta-communities is predicted according to the predicted weights. The node(s) identified as having the predicted likelihood of performing the anomalous action is a member of the community experiencing the structural change and/or a member of the community transferred between meta-communities. For example, for A-x_t-B, where the weight denoted x_t between two communities denoted A and B is a function of time between [t_0, t_1], where t_0 is some time in the past and t_1 is the current time (e.g., end of the historical time interval), the weight between the communities x_t is predicted for times [t_1, t_2], where t_2 is some time in the future (e.g., end of the future time interval).

Optionally, as an input to the extrapolation process, other community-based and/or meta-community based parameters may be used. The parameters may be computed for community nodes, meta-community nodes, community graphs, and/or meta-community graphs. The parameters may be a sequence of temporally adjacent parameters computed according to the sequence of temporally adjacent graphs, community graphs, and/or meta-community graphs. Exemplary parameters include: size of the community (e.g., number of nodes in the community node), size of the meta-community (e.g., number of community nodes in the meta-community node, total number of nodes in the meta-community), average degree, and the like. The input to the extrapolation process may be mathematically represented as (x_t, A-parameters_t, B-parameters_t) for t=[t_0, t_1], where x_t denotes the weights between community nodes and/or meta-community nodes, and A-parameters_t, B-parameters_t denotes the other community-based and/or meta-community based parameters.

Extrapolation of future weights based on the sequence of historical weights may be computed, for example, using linear regression, and/or LSTM neural network.

Optionally, the future weights are associated with a value indicative of likelihood of the respective node(s) performing the predicted anomalous action. The value indicative of likelihood of the respective node(s) performing the predicted anomalous action may be, for example, the $R^2$ value of the linear regression, value indicative of confidence fit of the prediction, and/or probability of accuracy of the prediction.

Alternatively or additionally, a trained statistical classifier computes the prediction of the anomalous action(s), for example, unification of two or more communities, splitting of a single community into two or more communities, and/or transfer of a community between meta-communities. The statistical classifier outputs the prediction in response to an input of a sequence of weights between community nodes of temporally adjacent community graphs, and/or a sequence of weights between meta-community nodes of temporally adjacent meta-community graphs. The weights are computed over the historical time interval, as described herein. The sequences of temporally adjacent parameters described (e.g., community parameters and/or meta-community parameter) may be provided as addition input into the classifier. In terms of mathematical representation, the input to the classifier is the weights in a given temporal window, denoted x_t, t=[t_0, t_1]. The output of the classifier may be a community restructuring operator, for example, a binary value, for example, for unification denoted as TRUE or 1=A-B→C, or no unification denoted as FALSE or 0=A-B→A-B.

The classifier may be trained on a training dataset including multiple training sequences of weights between community nodes of temporally adjacent training community graphs (i.e., for each of multiple dynamic graphs), and/or multiple training sequences of weights between meta-community nodes of temporally adjacent training meta-community graphs (i.e., for each of multiple dynamic graphs), optional sequences of community parameters and/or meta community parameters for the temporally adjacent community and/or meta-community graphs, and associated indication of anomalous actions.

One or more classifiers may be trained, for example, one classifier that outputs an indication of unification of two or more communities, and a second classifier that outputs an indication of transfer of a community between meta-communities. Alternatively, a single classifier is trained to output both the indication of unification and the indication of transfer.

In an exemplary implementation, the statistical classifier for predicting unification of two community nodes may be implemented, for example, as a neural network classifier, and/or LSTM (long short-term memory) network. The unification may be denoted as A-x_t-B, according to the mathematical notation described herein. For the neural network classifier, the input may be (x_t, A-parameters_t, B-parameters_t) as described herein. The output may be an indication of unification at time t+1 (or t+delta), for example, a binary indication such as 1 denoting unification and 0 denoting no unification. Training is performed using the training dataset described herein. For the LSTM network, the input may be (x_t, A-parameters_t, B-parameters_t), where t=[t_0,t_1]. The output may be an indication of unification at time t=[t_0+1, t_1+1], for example, a binary indication such as 1 denoting unification and 0 denoting no unification. Training is performed using the training dataset described herein.

In an exemplary implementation, the statistical classifier for predicting transfer of a community node from one meta-community to another community may be implemented, for example, as a neural network classifier, and/or LSTM network. The transfer may be denoted as ([−x_t-A]-y_t[ ])~x_t, y_t, where x_t denotes the sum weighted edges within the meta-community where the community is currently a member thereof and y_t denotes the sum weighted edges to the other meta-community where the community may potentially move to. For the neural network classifier, the input may be denoted as (x_t, y_t, [x]-parameters, [y]-parameters), where x_t and y_t are as described herein, [x]-parameters denotes parameters of the meta-community where the community is currently a member thereof and [y]-parameters denotes the parameters of other meta-community where the community may potentially move to. The output may be an indication of whether transfer happens and/or does not happen, for example, a binary indication such as 1 denoting transfer and 0 denoting no transfer. Training is performed using the training dataset described herein. For the LSTM network, the input may be denoted as (x_t, y_t, [x]-parameters, [y]-parameters), where t=[t_0, t_1]. The output may be an indication of whether transfer happens and/or does not happen at time t=[t_0+1,t_1+1]. Training is performed using the training dataset described herein.

Alternatively or additionally, anomalous action(s) performed by one or more nodes during the historical time interval are detected. For example, the node being a member of a community that united with another community during the historical time interval, the node being a member of a community that split off from another community during the historical time interval, and/or the node being a member of a community that transferred from one meta-community to another meta-community during the historical time interval.

Optionally, the prediction may be performed as a query.

At 114, the node(s) identified as having a predicted likelihood of performing one or more anomalous actions during the future time interval are provided, for example, stored on a data storage device, presented on a display, transmitted to a remote computing device (e.g., server, client terminal) over a network, and/or provided to another process for further processing.

The predicted anomalous actions may be identified and provided in association with the nodes.

Optionally, nodes that have been identified as performing abnormal action(s) during the historical time interval are provided. Identified nodes may be arranged according to anomalous actions performed during the historical time interval. For example, nodes that are part of communities that were previously part of a larger community and have split, and/or nodes that are part of a community that changed affiliation between different meta-communities.

One or more reports that include the identified nodes may be generated.

At 116, instructions may be generated according to the predicted anomalous action(s) and/or identified nodes. The instructions may be for execution of an automated process, for example, code instructions for execution by hardware processor(s). Alternatively or additionally, the instructions may be for execution of a manual process, for example, text, video, and/or other presentation generated on a display for a user to manually follow, and/or the text and/or images may be printed on paper for the user to manually follow.

The instructions may be for adapting at least one component of the network (e.g., the entities and/or network infrastructure, such as the client terminals, code executed by the client terminals, network bandwidth, network architecture, server configuration, and router configuration) for ensuring availability of network resources for interactions between entities during the future time interval. In another example, the interactions may be for automated delivery of targeted advertisements to entities according to the predicted anomalous actions, where the advertisements are designed to change the interactions between entities over the network.

The instructions may be for adapting one or more parameters of the entities (e.g. client terminals, applications, user accounts) and/or adapting one or more parameters of the network resources that provide the medium for interaction between the network entities, optionally to provide sufficient network resources for interactions between entities in view of the predicted anomalous actions.

Optionally, an automated process is triggered by execution of the generated instructions, based on the nodes predicted to perform anomalous action(s).

The generated instructions may be executed, for example, by the client terminal and/or server that provided the dataset from which the dynamic graph (i.e., the multiple sequential temporally adjacent graphs) was computed for performing the prediction.

The instructions may be generated for execution of one or more automated processes (e.g., code for execution by hardware processor(s)) and/or manual processes. Exemplary generated instructions include, for example, instructions for preventing the node(s) from performing the predicted anomalous action(s), instructions for the node(s) to perform the predicted anomalous action(s) earlier than when predicted, instructions for performing another action and/or process (e.g., automated and/or manual) prior to the predicted anomalous action(s) being performed by the node(s), and/or instructions for performing the anomalous action(s) by another process prior to the node(s) performing the at anomalous action(s).

The generated instructions may include, for example, instructions for: sending of messages to users of user accounts denoted by the nodes, indicative of recommendations for preventing the predicted action(s) and/or for pre-empting the predicted action(s). In another example, the automated process may automatically perform the predicted action(s) for the node, prior to the node performing the predicted action(s). For example, targeted advertisements may be selected for sending to the user accounts associated with the identified nodes. The target advertisements may be selected, for example, according to the predicted anomalous action (e.g., an advertisement on a discount on a mortgage for entities predicted to take out a mortgage), selected according to an attempt for preventing the predicted anomalous action (e.g., a discount offer on cellular services for customers predicted to change service provides), and selected for another product or service in advance of the predicted anomalous action (e.g., offer to buy new luggage for individuals predicted to book airline tickets for a vacation). Additional examples of generated instructions are described herein.

Figure 3:
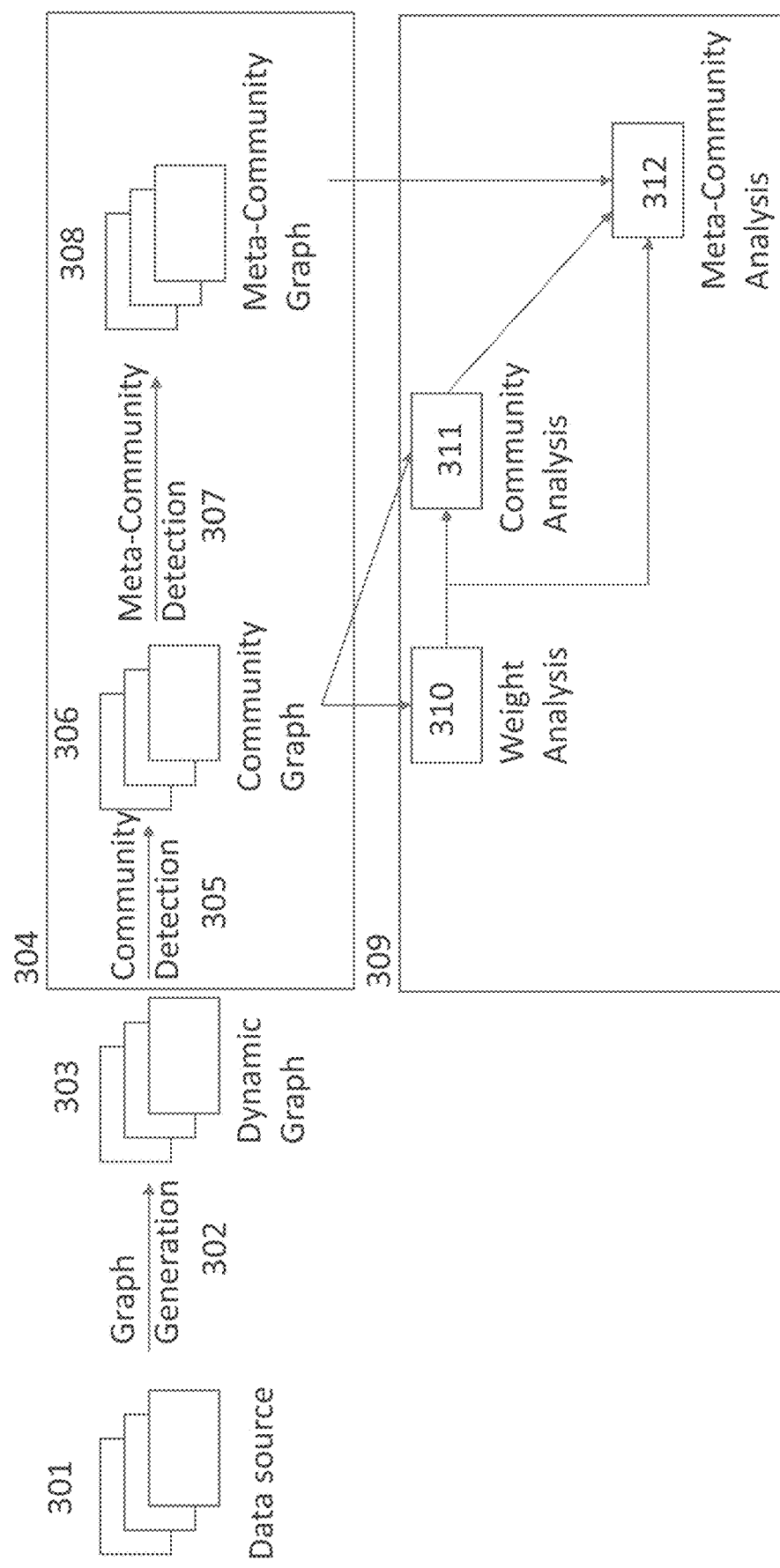
FIG. 3 is a dataflow diagram depicting an exemplary process for analyzing a dynamic graph, in accordance with some embodiments of the present invention.

Reference is now made to FIG. 3, which is a dataflow diagram depicting an exemplary process for analyzing a dynamic graph, in accordance with some embodiments of the present invention. The dataflow described with reference to FIG. 3 may be implemented based on features described with reference to FIG. 1, and/or by components of system 200 described with reference to FIG. 2. A datasource 301 provides a dataset for graph generation 302 of a dynamic graph 303. The dynamic graph 303 is analyzed by an analysis process 304, which performs a computing detection 305 process to compute community graphs 306. A meta-community detection process 307 is executed on community graphs 306 to compute meta-community graphs 308. A prediction process 309 analyzes community graphs 306 to perform a weight analysis 310 and community analysis 311. A meta-community analysis 312 is performed based on the outcome of the weight analysis 310, community analysis 311, and meta-community graphs 108. The weight analysis 310 may include identification of weight changes between community nodes and/or meta-community nodes, as described herein. Community analysis 311 may include detection of unification and/or splitting of communities, as described herein. Meta-community analysis 312 may include detection of transfer of community nodes between meta-communities, as described herein.

Figure 4:
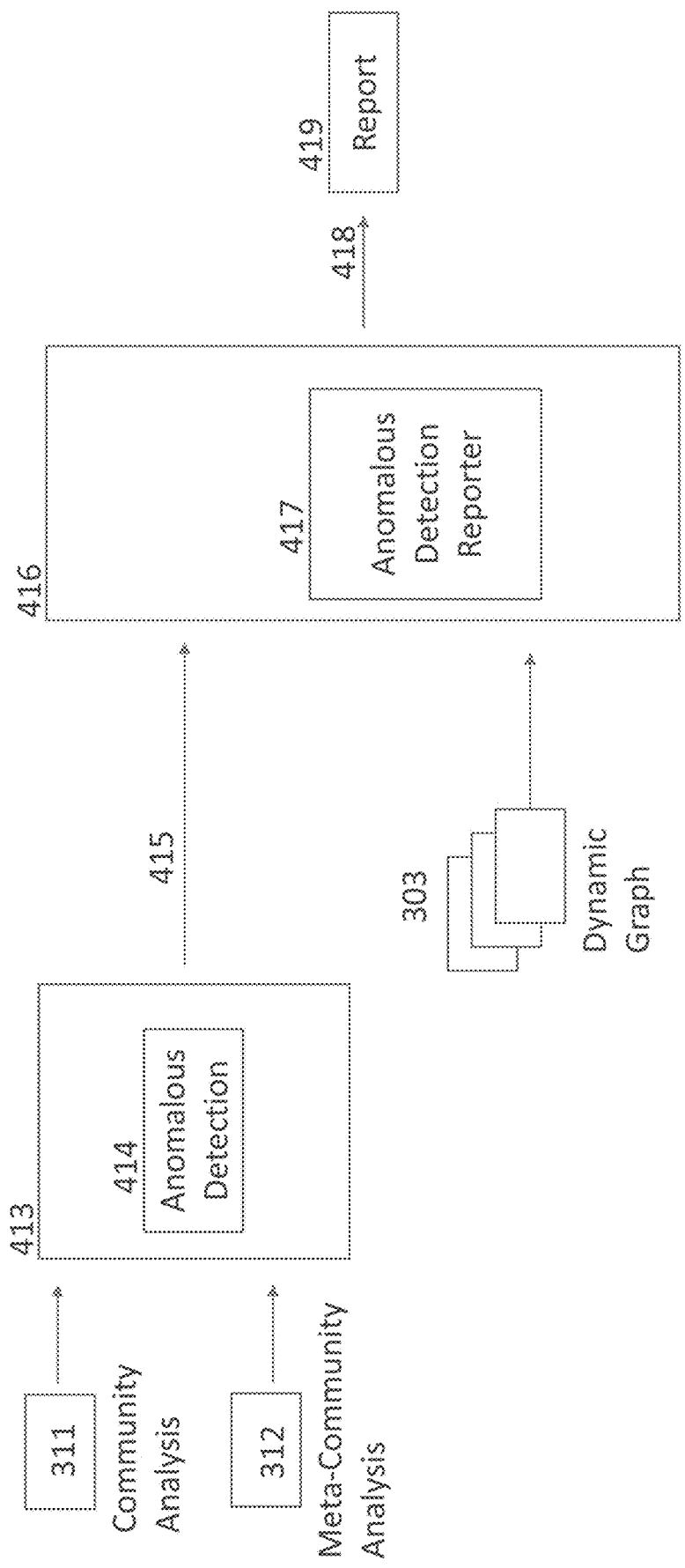
FIG. 4 is a dataflow diagram depicting an exemplary process for identifying node(s) that performed an anomalous action(s) during a historical time interval according to the analysis performed by the dataflow of FIG. 3, in accordance with some embodiments of the present invention.

Reference is now made to FIG. 4, which is a dataflow diagram depicting an exemplary process for identifying node(s) that performed an anomalous action(s) during a historical time interval according to the analysis performed by the dataflow of FIG. 3, in accordance with some embodiments of the present invention. The dataflow described with reference to FIG. 4 may be implemented based on features described with reference to FIG. 1, and/or by components of system 200 described with reference to FIG. 2. Components of the dataflow described with reference to FIG. 4 may be based on components of the dataflow described with reference to FIG. 3. A weight analysis process 413 analyses the output of the community analysis 311 and the meta-community analysis 312 (described with reference to FIG. 3) to compute weights between community nodes and/or meta-community nodes. The output of weight analysis process 413 analysis is used by an anomaly detection process 414 to detect unification, splitting, and/or transfer of community nodes, as described herein. An output 415 of anomaly detection process 414 is fed into a computing device 416 which executes an anomalous detection reporting process 417 that identifies nodes of dynamic graph 313 that performed anomalous actions 418. A report 419 including the nodes that performed anomalous actions 418 is provided.

Figure 5:
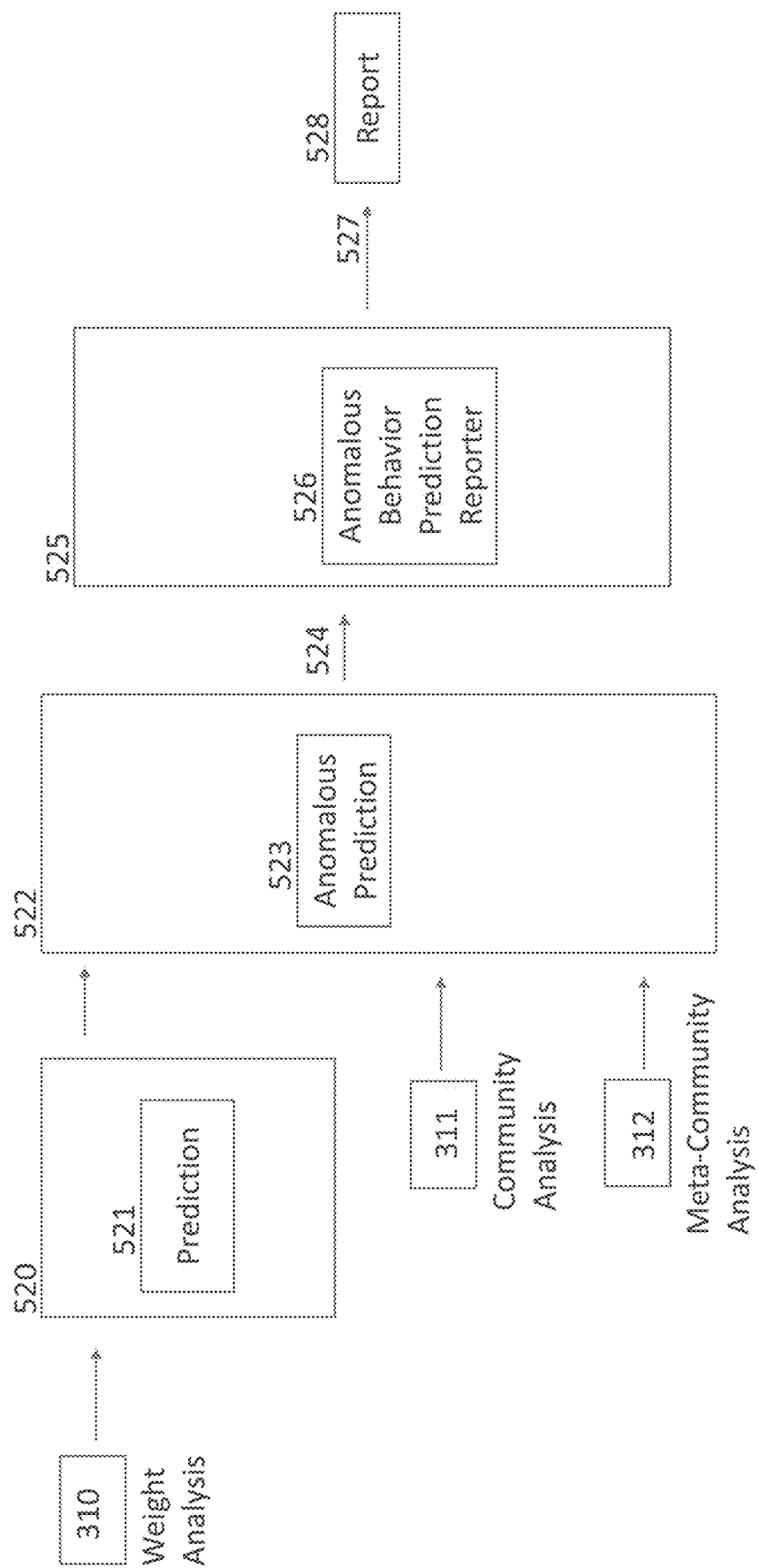
FIG. 5 is a dataflow diagram depicting an exemplary process for identifying node(s) likely to perform anomalous action(s) during a future time interval according to the analysis performed by the dataflow of FIG. 3, in accordance with some embodiments of the present invention.

Reference is now made to FIG. 5, which is a dataflow diagram depicting an exemplary process for identifying node(s) likely to perform anomalous action(s) during a future time interval according to the analysis performed by the dataflow of FIG. 3, in accordance with some embodiments of the present invention. The dataflow described with reference to FIG. 5 may be implemented based on features described with reference to FIG. 1, and/or by components of system 200 described with reference to FIG. 2. Components of the dataflow described with reference to FIG. 5 may be based on components of the dataflow described with reference to FIG. 3. A weight prediction process 520, optionally a statistical classifier 521, analyses the output of weight analysis 310 (described with reference to FIG. 3) to predict future weights between community nodes and/or meta-community nodes. An anomalous prediction process 523 executed by a computing device 522 obtains the output of weight prediction process 520, output of the community analysis 311 and the meta-community analysis 312 (described with reference to FIG. 3), to compute and output predicted anomalous actions 524. A computing device 525 executing an anomalous behavior prediction reporter 526 outputs nodes of the dynamic graph 527 predicted to perform anomalous actions 524. A reporter process 528 provides the nodes predicted to perform anomalous actions 527.

Figure 6:
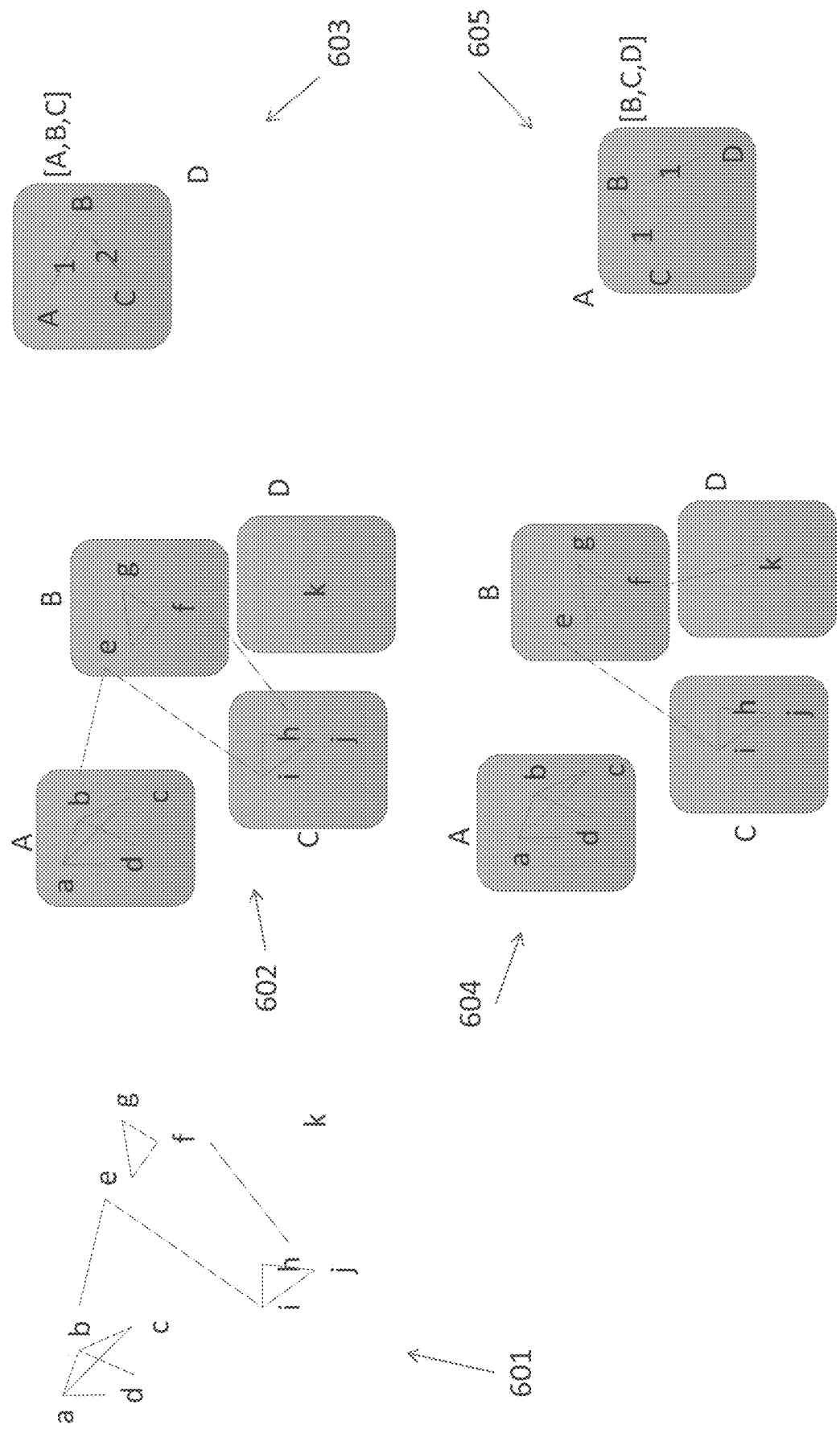
FIG. 6 is a schematic depicting examples of nodes of the dynamic graph (i.e., the graphs), community nodes of the community graphs, and meta-community nodes of the meta-community graphs, in accordance with some embodiments of the present invention.

Reference is now made to FIG. 6, which is a schematic depicting examples of nodes of the dynamic graph (i.e., the graphs), community nodes of the community graphs, and meta-community nodes of the meta-community graphs, in accordance with some embodiments of the present invention. Schematic 601 denotes nodes of the dynamic graph (or graphs) represented by lower case letters a-k. Lines between letters denote interactions between entities denoted by the nodes. Schematics 602 and 604 denote communities (i.e., community nodes) made up of nodes (from schematic 602. Community nodes are represented by upper case letters A-D. Lines between uppercase letters denote interactions between community nodes. Interactions between community nodes may be assigned weights, as described herein. Schematics 603 and 605 denote meta-communities (i.e., meta-community nodes) represented by sets of uppercase letters in square brackets, i.e., [A,B,C] and [B,C,D].

Figure 7:
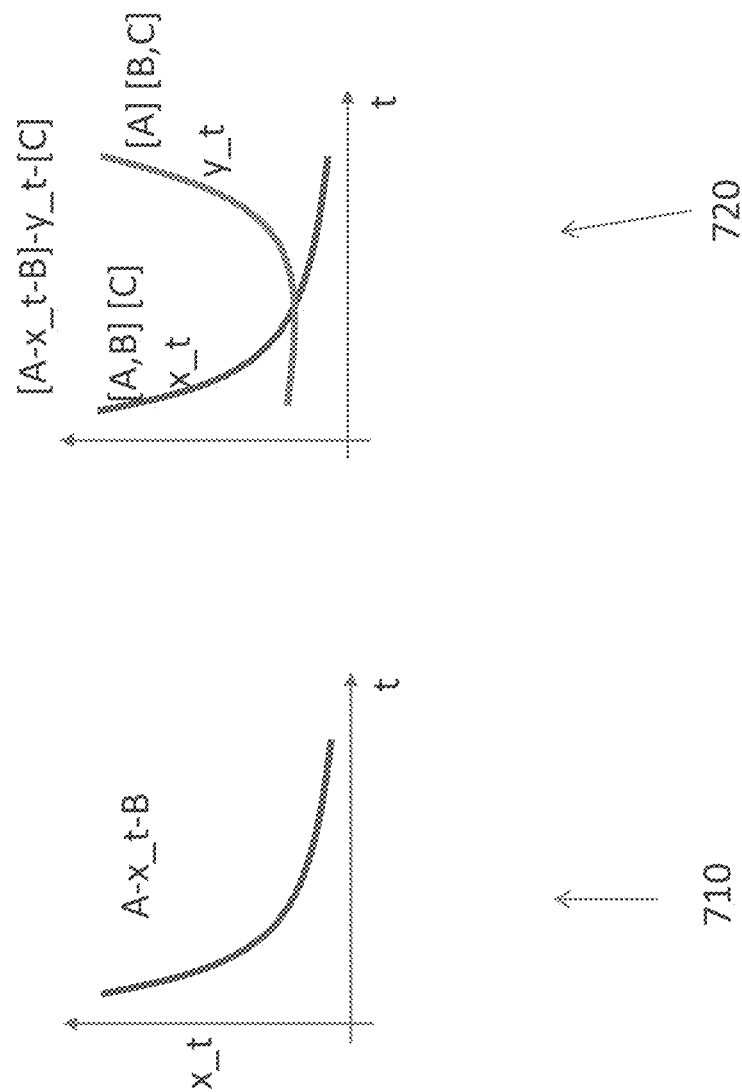
FIG. 7 is a schematic depicting an exemplary analysis of changes in weights between communities, in accordance with some embodiments of the present invention.

Reference is now made to FIG. 7, which is a schematic depicting an exemplary analysis of changes in weights between communities, in accordance with some embodiments of the present invention. Schematic 710 is a graph denoting change in the weight of the link between community node A and community node B as a function of time. The weight is denoted as $x\_t$ and plotted on the y axis. Time is represented by the x axis. The change in weight between communities A and B is denoted as A-$x\_t$-B. Schematic 720 includes two graphs, which together denote transfer of communities between meta-communities, in particular, transfer of community B from meta-community [A,B] to meta-community [B,C] based on changes in the weights between community B and the meta-communities, denoted as [A-$x\_t$-B]-$y\_t$-[C]. A first graph denotes reduction over time in the value of the weight $x\_t$ between meta-community [A,B] and meta-community [C]. A second graph denotes a corresponding increase over time in the value of the weight $y\_t$ between meta-community [A] and meta-community [B,C].

Figure 8:
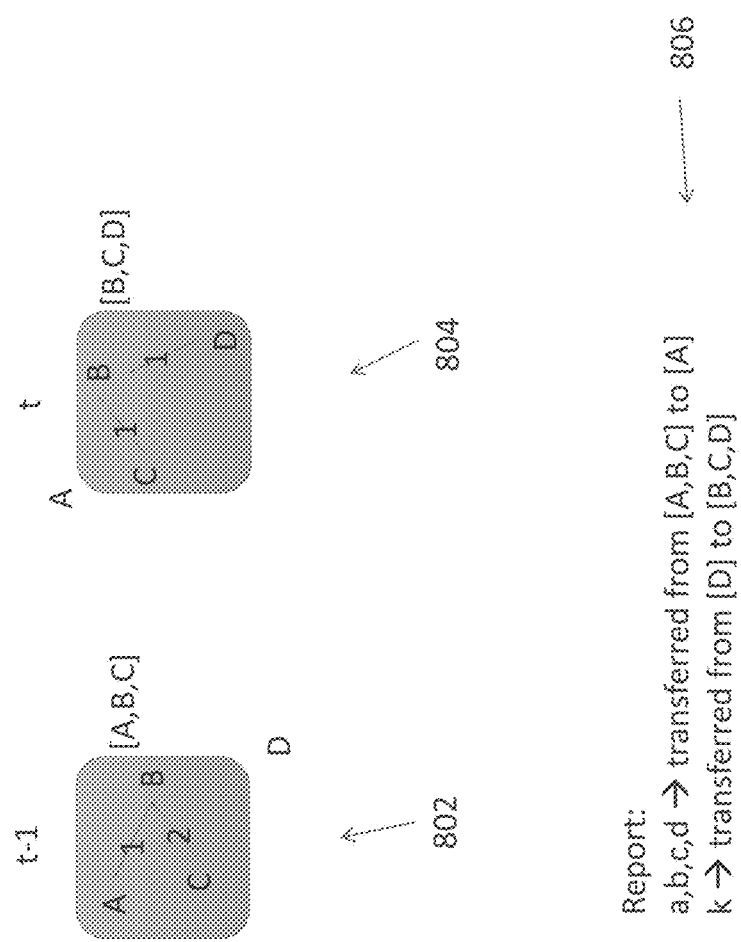
FIG. 8 is a schematic of depicting an example of nodes identified as likely to perform anomalous actions in a future time interval, in accordance with some embodiments of the present invention.

Reference is now made to FIG. 8, which is a schematic depicting an example of nodes identified as likely to perform anomalous actions in a future time interval, in accordance with some embodiments of the present invention. FIG. 8 graphically depicts a meta-community graph 802 at time t−1 (denoting historical time interval) and at time t (denoting future time interval) 804. A report 806 may be generated indicative of the nodes (of the dynamic graph used to create the meta-community graphs) and the predicted anomalous actions. In the present case, based on meta-community graphs 802 and 804, nodes a,b,c,d are predicted to transfer from meta-community [A,B,C,D] to meta-community [A], and node k is predicted to transfer from meta-community [D] to meta-community [B,C,D].

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing devices will be developed and the scope of the term computing device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A method for identifying at least one node of a dynamic graph predicted to perform an anomalous action for adapting components of a network for ensuring availability of network resources for interactions between entities during a future time interval, comprising:

providing a plurality of graphs each indicative of a respective sequential snapshot of the dynamic graph obtained over a historical time interval, wherein nodes of the plurality of graphs denote entities, and edges of the plurality of graphs denote interactions between the entities over the network;

computing a plurality of community graphs according to the plurality of graphs, each community graph depicting groups of entities grouped into a plurality of communities;

computing a plurality of meta-community graphs according to the plurality of community graphs, each meta-community graph depicting groups of communities of the community graphs grouped into a plurality of meta-communities;

analyzing dynamics of the plurality of community graphs to detect changes between two temporally adjacent community graphs;

analyzing dynamics of the plurality of meta-community graphs to detect changes between two temporally adjacent meta-community graphs;

identifying at least one entity corresponding to at least one node of the dynamic graph according to a predicted likelihood of performing the anomalous action during the future time interval, based on at least one of changes detected in the plurality of community graphs and changes detected in the plurality of meta-community graphs, according to the analysis of the dynamics of the plurality of community graphs and the dynamics of the plurality of meta-community graphs; and generating instructions in response to the predicted likelihood of performing an anomalous action during a future time interval and the identified at least one entity for adapting at least one component of the network for ensuring availability of network resources for required interactions between entities during the future time interval.

2. The method according to claim 1, wherein the generated instructions are selected from the group consisting of: preventing the at least one entity from performing the prediction anomalous action, performing the predicted anomalous action earlier than the future time interval, performing another target action prior to the predicted anomalous action being performed by the at least one entity, and performing the anomalous action by another entity prior to the at least one entity performing the predicted anomalous action.

3. The method according to claim 1, wherein each respective community graph is computed according to each respective graph, each respective community graph including community nodes computed by assigning each node of each respective graph to one community node of the respective community graph.

4. The method according to claim 3, wherein each respective meta-community graph is computed according to each respective community graph, each respective meta-community graph comprising a plurality of meta-community nodes, wherein each community node of each respective community graph is assigned to one meta-community node, wherein weights between meta-community nodes are proportional to a number of edges between corresponding community nodes.

5. The method according to claim 1, wherein the changes between two temporally adjacent community graphs include at least one of: a change in a weight between community nodes, and a change in structure of community nodes.

6. The method according to claim 1, wherein the changes between two temporally adjacent meta-community graphs include a transfer of communities between meta-community nodes.

7. The method according to claim 1, wherein the predicted likelihood of performing the anomalous action is computed according to the analyzed dynamics of the plurality of community graphs and the analyzed dynamics of the plurality of meta-community graphs.

8. The method according to claim 1, wherein the anomalous action predicted to be performed by the identified at least one node is selected from the group consisting of: being a member of a community that split off from another community, being a member of a community that merged with another community, and being a member of a community that transferred between meta-communities.

9. The method according to claim 1, wherein temporally adjacent graphs of the plurality of graphs overlap in at least one common node, and each graph of the plurality of graphs has a unique combination of nodes and edges that is not present in any other graph.

10. The method according to claim 1, wherein the graphs are computed according to at least one dataset, wherein nodes of the graphs denote entities of records of the at least one dataset, and edges of the graphs denote interactions between entities of the records of the at least one dataset.

11. The method according to claim 1, wherein entities are selected from the group consisting of: user accounts, wallets, social network accounts, bank accounts, shopping accounts, email accounts, gaming application, blockchain user accounts, mobile device, smartphone, standard phones, servers, applications being used by the user, and client terminals, and interactions are selected from the group consisting of: calls, multimedia objects sent from one entity to another entity, financial transactions, a game played by two or more entities, transactions associated with smart contracts, and transfer of blockchain-based tokens or cryptocurrencies.

12. The method according to claim 1, wherein the communities of each respective community graph of the plurality of community graphs are computed according to an initial community seed according to the communities computed for the previous community graph.

13. The method according to claim 5, wherein the change in weight between communities is selected from the group consisting of: increase in weight, decreasing in weight, or disappearance of the weight.

14. The method according to claim 5, wherein the change in structure of community nodes is selected from the group consisting of: appearance of a new community node, disappearance of a previously existing community node, split of a single existing community node into two or more communities, and unification of two or more communities into a single community.

15. The method according to claim 1, wherein the predicted likelihood of performing the anomalous action is computed according to a predicted likelihood of unification of two or more communities into a single community, wherein the identified at least one entity corresponding to the at least one node is a member of one of the two or more communities unified into the single community.

16. The method according to claim 14, wherein the unification of two or more communities into the single community is predicted for the future time interval according to change in weight between the two or more communities computed over the historical time interval.

17. The method according to claim 15, wherein the change in weight comprises a computed trend indicative of relative increase in weight over a plurality of temporally sequential community graphs.

18. The method according to claim 1, wherein the predicted likelihood of performing the anomalous action is computed according to a predicted likelihood of transfer of one community between two meta-communities.

19. The method according to claim 18, wherein the predicted likelihood of transfer of one community between two meta-communities is computed according to change in weight between the one community and each of the two meta-communities.

20. The method according to claim 19, wherein the transfer of one community from a first meta-community to a second meta-community of the two meta-communities is predicted according to computed pattern indicative of an increase in the weight between the one community and the second meta-community and a decrease in the weight between the one community and the first meta-community over a plurality of temporally sequentially meta-community graphs.

21. The method according to claim 1, wherein the predicted likelihood of performing the anomalous action is computed by extrapolating the analyzed dynamics of the plurality of community graphs and the meta-community graphs over the historical time interval into the future time interval.

22. The method according to claim 21, wherein the extrapolation the analyzed dynamics comprises extrapolating weights between community nodes of a sequence of temporally adjacent community graphs over the historical time interval for predicting weights into the future time interval.

23. The method according to claim 22, further comprising predicting according to the predicted weights, at least one of: a change in structure of communities, and a transfer of communities between meta-communities, wherein the at least one entity corresponding to the at least one node identified according to the predicted likelihood of performing the anomalous action is a member of a community experiencing a structural change and/or a member of the community transferred between meta-communities.

24. The method according to claim 1, wherein the predicted likelihood of performing an anomalous action is performed by a trained statistical classifier that is provided at least one of: a sequence of weights between community nodes of temporally adjacent community graphs, and a sequence of weights between meta-community nodes of temporally adjacent meta-community graphs, the statistical classifier trained on a training dataset including at least one of: a plurality of training sequences comprising weights between community nodes of temporally adjacent training community graphs, a plurality of training sequences of weights between meta-community nodes of temporally adjacent training meta-community graphs, and associated indication of training anomalous actions.

25. The method according to claim 1, further comprising detecting anomalous actions performed by at least one entity corresponding to the at least one node during the historical time interval.

26. The method according to claim 1, wherein the predicted likelihood of performing the anomalous action is further computed according to at least one of a sequence of a plurality of meta-community parameters of meta-community nodes of sequential temporally adjacent meta-community graphs, and a sequence of a plurality of community parameters of community nodes of sequential temporally adjacent community graphs.

27. The method according to claim 26, wherein the meta-community parameters are selected from the group consisting of: number of community nodes in respective meta-community nodes, and average degree, wherein the community parameters are selected from the group consisting of: number of nodes in respective community nodes, and average degree.

28. The method according to claim 1, wherein the instructions are for providing targeted advertisements to the identified at least one entity.

29. A system for identifying at least one node of a dynamic graph predicted to perform an anomalous action for adapting components of a network for ensuring availability of network resources for interactions between entities during a future time interval, comprising:
   at least one hardware processor; and
   a non-transitory memory having stored thereon a code for execution by the at least one hardware processor, the code comprising instructions for:
      providing a plurality of graphs each indicative of a respective sequential snapshot of the dynamic graph obtained over a historical time interval, wherein nodes of the plurality of graphs denote entities, and edges of the plurality of graphs denote interactions between the entities over the network;
      computing a plurality of community graphs according to the plurality of graphs, each community graph depicting groups of entities grouped into a plurality of communities;
      computing a plurality of meta-community graphs according to the plurality of community graphs, each meta-community graph depicting groups of communities of the community graphs grouped into a plurality of meta-communities;
      analyzing dynamics of the plurality of community graphs to detect changes between two temporally adjacent community graphs;
      analyzing dynamics of the plurality of meta-community graphs to detect changes between two temporally adjacent meta-community graphs; and
      identifying at least one entity corresponding to at least one node of the dynamic graph according to a predicted likelihood of performing the anomalous action during the future time interval, based on at least one of changes detected in the plurality of community graphs and changes detected in the plurality of meta-community graphs, according to the analysis of the dynamics of the plurality of community graphs and the dynamics of the plurality of meta-community graphs; and
      generating instructions in response to the predicted likelihood of performing an anomalous action during a future time interval and the identified at least one entity for adapting at least one component of the network for ensuring availability of network resources for required interactions between entities during the future time interval.

30. A computer program product for identifying at least one node of a dynamic graph predicted to perform an anomalous action for adapting components of a network for ensuring availability of network resources for interactions between entities during a future time interval, comprising:
   a non-transitory memory having stored thereon a code for execution by at least one hardware processor, the code comprising instructions for:
      providing a plurality of graphs each indicative of a respective sequential snapshot of the dynamic graph obtained over a historical time interval, wherein nodes of the plurality of graphs denote entities, and edges of the plurality of graphs denote interactions between the entities over the network;
      computing a plurality of community graphs according to the plurality of graphs, each community graph depicting groups of entities grouped into a plurality of communities;
      computing a plurality of meta-community graphs according to the plurality of community graphs, each meta-community graph depicting groups of communities of the community graphs grouped into a plurality of meta-communities;
      analyzing dynamics of the plurality of community graphs to detect changes between two temporally adjacent community graphs;
      analyzing dynamics of the plurality of meta-community graphs to detect changes between two temporally adjacent meta-community graphs; and
      identifying at least one entity corresponding to at least one node of the dynamic graph according to a predicted likelihood of performing the anomalous action during the future time interval, based on at least one of changes detected in the plurality of community graphs and changes detected in the plurality of meta-community graphs, according to the analysis of the dynamics of the plurality of community graphs and the dynamics of the plurality of meta-community graphs; and generating instructions in response to the predicted likelihood of performing an anomalous action during a future time interval and the identified at least one entity for adapting at least one component of the network for ensuring availability of network resources for required interactions between entities during the future time interval.

* * * * *